United States Patent [19]
Templeton

[11] Patent Number: 6,155,940
[45] Date of Patent: Dec. 5, 2000

[54] ADJUSTABLE CAM WEIGHTS FOR TORQUE CONVERTER

[75] Inventor: Jack B. Templeton, Williamsburg, Ind.

[73] Assignee: Hoffco, Inc., Richmond, Ind.

[21] Appl. No.: 09/288,447

[22] Filed: Apr. 8, 1999

Related U.S. Application Data

[60] Provisional application No. 60/081,113, Apr. 8, 1998.

[51] Int. Cl.$^7$ .............................. F16H 59/00; F16H 55/56
[52] U.S. Cl. .................................. 474/13; 474/46; 474/12
[58] Field of Search .................................. 474/12, 13, 14, 474/46, 44, 19, 17

[56] References Cited

U.S. PATENT DOCUMENTS

| | | | |
|---|---|---|---|
| 2,612,054 | 9/1952 | Davis | 474/46 X |
| 2,928,286 | 3/1960 | Davis | 474/13 |
| 3,625,079 | 12/1971 | Hoff . | |
| 3,747,721 | 7/1973 | Hoff . | |
| 3,824,876 | 7/1974 | Brooks | 474/13 |
| 3,850,050 | 11/1974 | Lemmens | 474/13 X |
| 4,179,946 | 12/1979 | Kanstoroom | 474/13 X |

*Primary Examiner*—David A. Bucci
*Assistant Examiner*—Marcus Charles
*Attorney, Agent, or Firm*—Barnes & Thornburg

[57] ABSTRACT

A torque converter assembly is provided for adjusting the overall speed of a vehicle. The assembly comprises a driver pulley including an outer drum, a movable flange, a chamber formed by the outer drum and movable flange, a first weight and a second weight each positioned to lie within the chamber, and a shaft extending into the chamber about which the first and second weights are positioned to lie for rotation. The assembly further comprises a pair of guideposts each having a first end fixedly coupled to a respective one of the first and second weights and a second end inserted in the other of the first and second weights and a stopper coupled to the second end of each guidepost to limit the radially outward movement of the first and second weights.

17 Claims, 5 Drawing Sheets

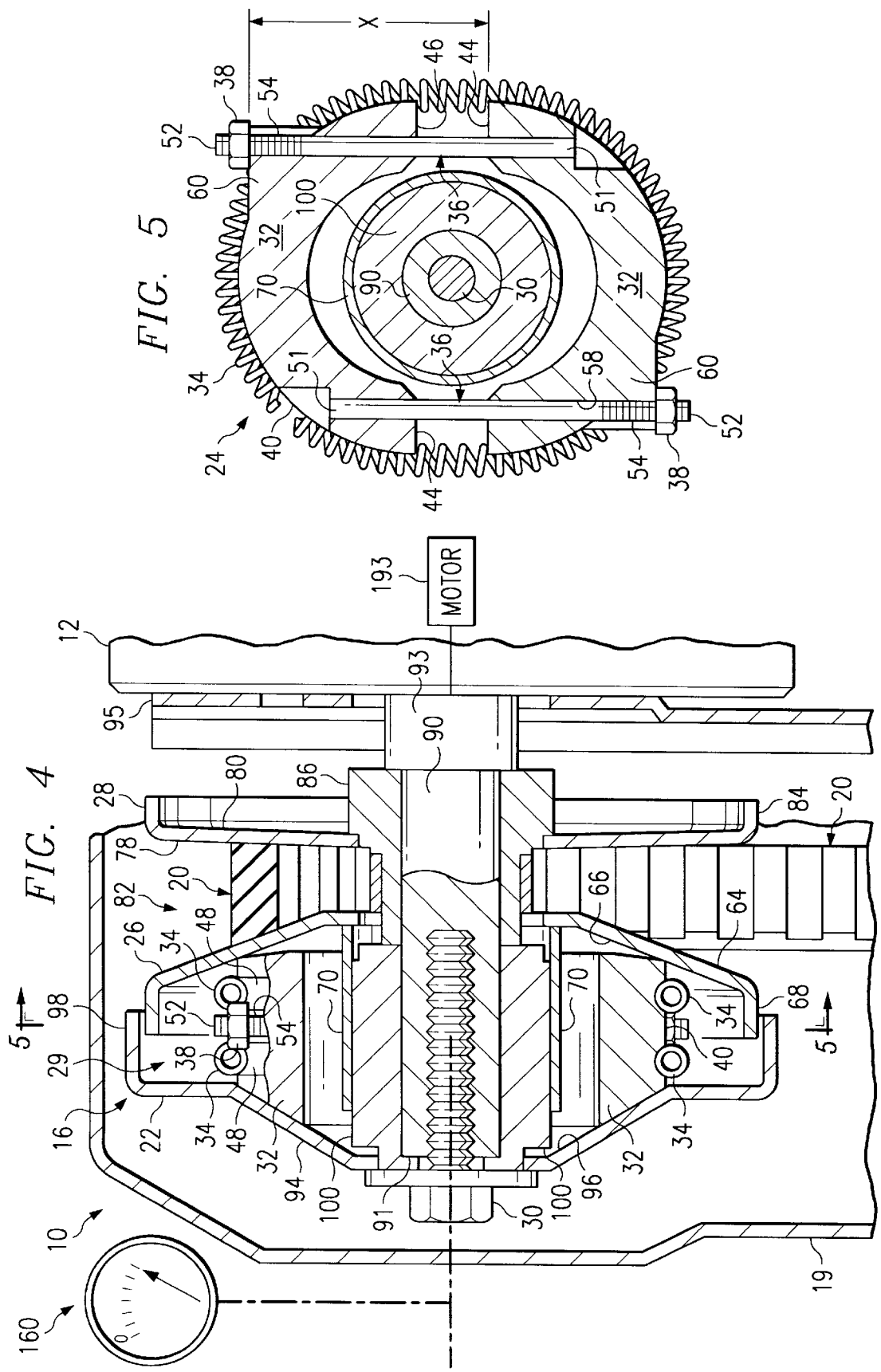

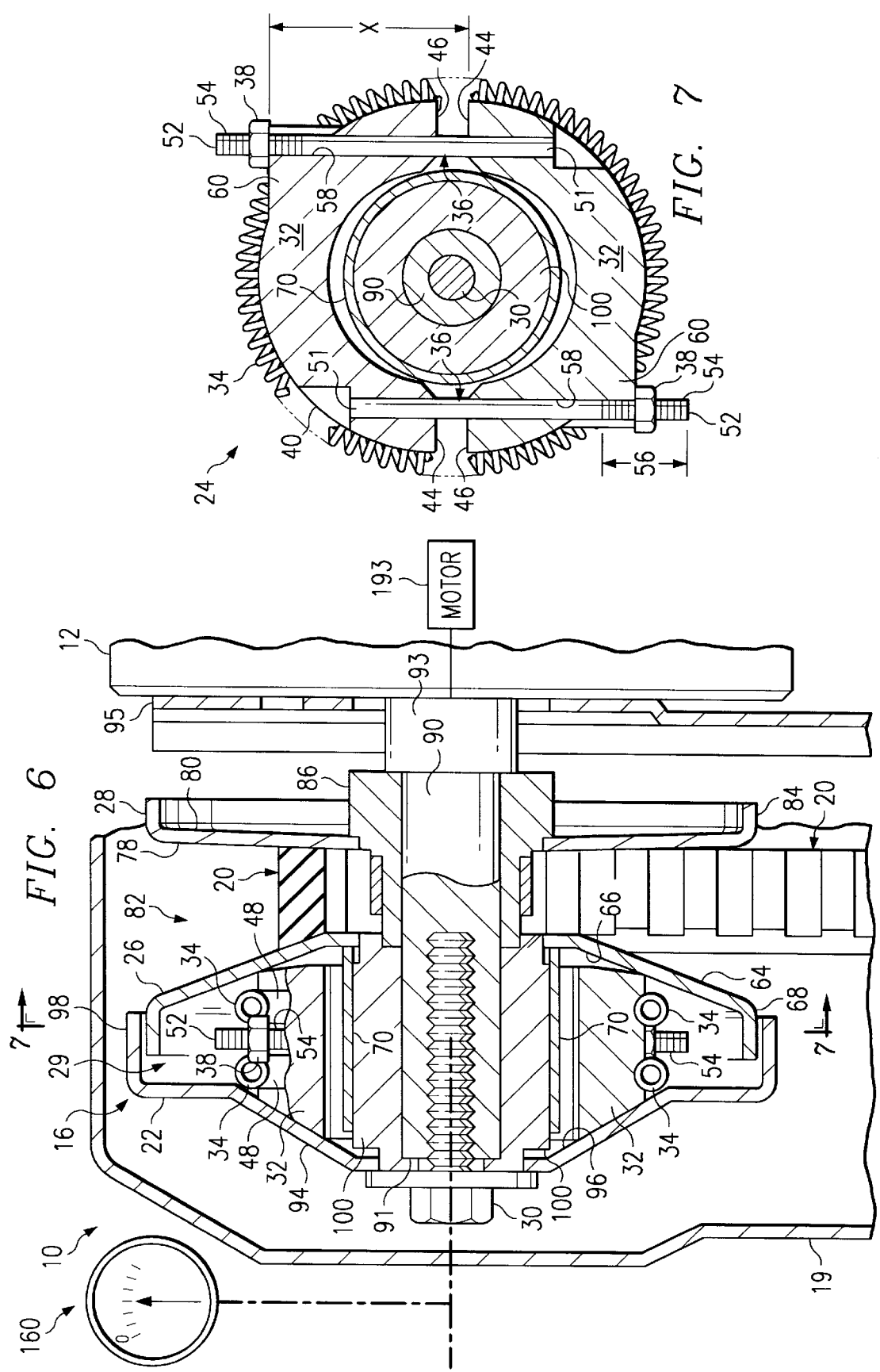

ADJUSTABLE CAM WEIGHTS FOR TORQUE CONVERTER

BACKGROUND AND SUMMARY OF THE INVENTION

This application claims priority under 35 U.S.C. § 119(e) to U.S. Provisional Application Ser. No. 60/081,113, filed Apr. 8, 1998, which is expressly incorporated by reference herein.

The present invention relates to a torque converter, and particularly to a torque converter for use with go-karts, mini-bikes, and the like. More particularly, the present invention relates to torque converters including a pulley system with centrifugal weights.

Torque converters are commonly used on go-karts and mini bikes and the like to convert the speed of the motor to an output shaft attached to a wheel. Additionally, torque converters act to adjust the output of the motor as torque is encountered by the wheel. For example, a torque converter assembly typically includes a torque-responsive pulley such that increased torque or resistance seen by the wheel will in turn, act to decrease the speed of the go-kart as disclosed in U.S. Pat. No. 3,747,721 to Stephen J. Hoff.

A torque converter includes a pulley system attached to the motor such that a first pulley rotates at the same speed as the motor. Many torque converters also include centrifugal weights within the first pulley which essentially operate to control the speed of the motor and the rotational rate of the wheel. As the motor speeds up, the centrifugal force causes the weights to expand outward, which translates to an increased rotational rate of the wheel. If the wheel encounters increased torque or resistance, however, the weights are urged inward against the centrifugal force thereby causing the motor to reduce its speed.

According to the present invention, a torque converter assembly for adjusting the overall speed of a motorized vehicle includes a driver pulley having first and second weights each positioned to lie within a chamber formed by an outer drum and a movable flange. The driver pulley also includes a shaft extending into the chamber about which each weight rotates. A guidepost is fixedly coupled to each of the first and second weights at a first end and is movably coupled at a second end to the other of the first and second weights. A stopper is provided and is coupled to the second end of each guidepost in order to limit the radially outward movement of each weight.

In preferred embodiments, the second end of each guidepost is threaded and each stopper is threadably coupled to the respective guidepost. Each stopper is thus rotatable about the longitudinal axis of each guidepost to engage the internal thread on the stopper with the external thread on the guidepost to cause the stopper to move along the length of each guidepost in order to adjust a distance X from each stopper to the first end of each respective guidepost. Each weight also includes a stop block formed to include a channel for slidably receiving one of the guideposts therein. Each stop block is also formed to engage the stopper coupled to the guidepost received within the channel in order to limit the radially outward movement of each weight.

Features and advantages of the present invention will become apparent to those skilled in the art upon consideration of the following detailed description of the invention.

BRIEF DESCRIPTION OF THE DRAWINGS

The detailed description particularly refers to the accompanying figures in which:

FIG. 4 a view similar to FIG. 2 showing only the driver pulley and an upper portion of the belt, the driver pulley rotating at a maximum speed as illustrated by the speedometer and causing the C-shaped weights of the weight assembly to separate due to centrifugal forces, and showing the locking nuts of the weight assembly limiting the radially outward movement of the C-shaped weights away from the axis of rotation of the driver pulley in order to limit the maximum speed of the go-kart;

FIG. 5 is a sectional view taken along line 5—5 of FIG. 4 showing the weight assembly of the driver pulley as it rotates at a set maximum speed and showing the locking nuts acting as a "stop" against the C-shaped weights so that a limit may be kept on the radial position of the weights relative to the axis of rotation of the driver pulley;

FIG. 6 is a view similar to FIG. 4 showing the driver pulley of the torque converter and also showing the locking nuts positioned midway along the threaded portion of each threaded rod thereby further limiting the radially outward movement of the C-shaped weights relative to the axis of rotation of the driver pulley; and FIG. 7 is a sectional view taken along line 7—7 of FIG. 6 showing the weight assembly rotating at a reduced speed due to the placement of the locking nuts along the threaded rods.

DETAILED DESCRIPTION OF THE DRAWINGS

Figure 1:
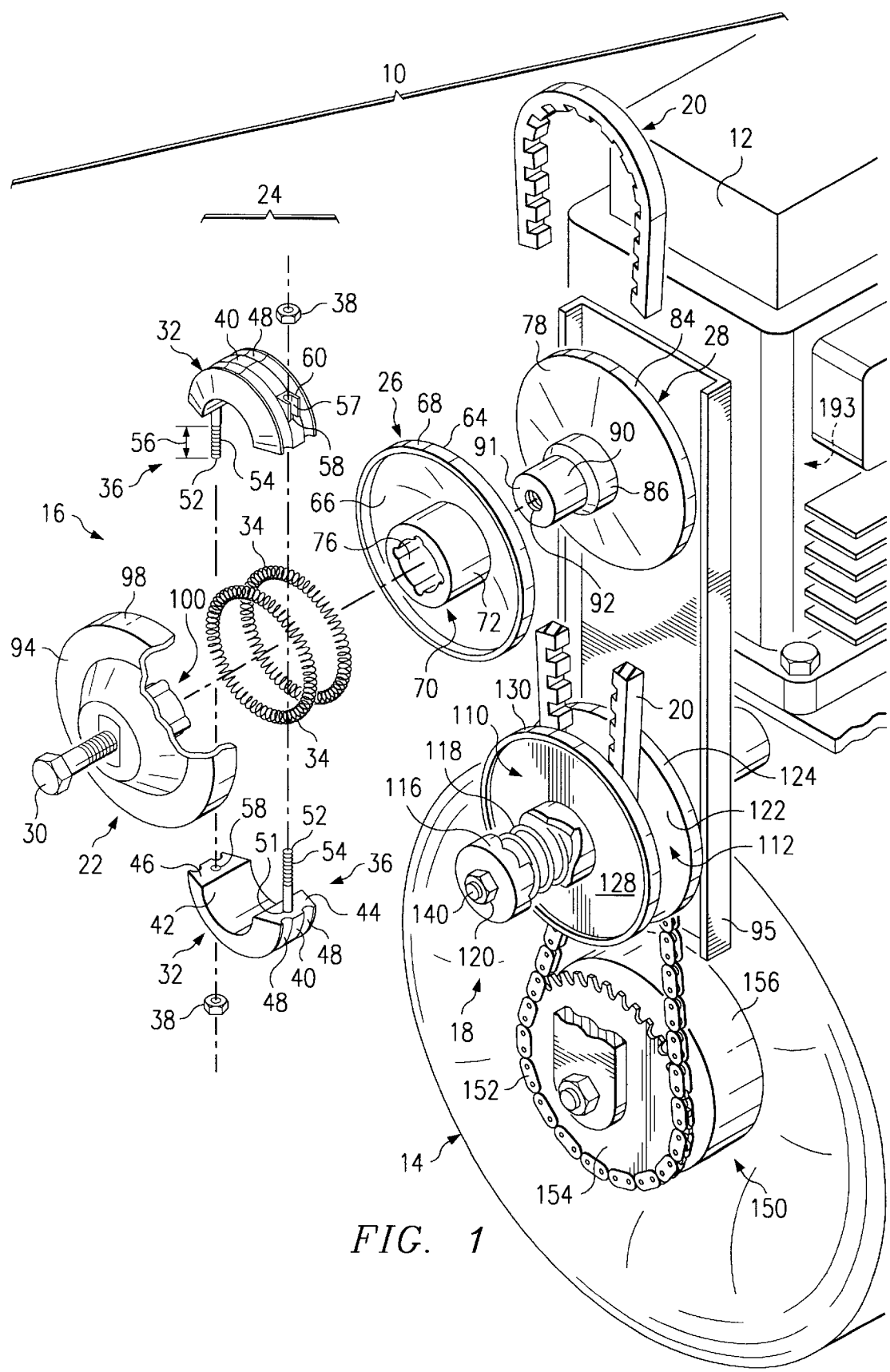
FIG. 1 is a exploded, perspective view of a torque converter in accordance with the invention coupled to a go-kart and a go-kart wheel and showing the torque converter including adjustable upper and lower C-shaped weights arranged to be mounted on a driver pulley that is coupled to a motor, the weights operating to adjust the rotational rate of the motor as seen by the wheel and to adjust the rotational rate of the wheel as seen by the motor, and showing a driven pulley coupled to the driver pulley by a belt and to a lower wheel hub sprocket by a chain.

A torque converter assembly 10 is provided for translating the speed of a motor 193 of a go-kart 12 to the wheels 14 of go-kart 12. Torque converter assembly 10 also responds to any type of torque which may be "seen" by wheels 14 of go-kart 12 and thus makes adjustments to decrease the speed of the motor. Torque converter assembly 10 includes upper and lower C-shaped weights 32 coupled together by guideposts 36 and stoppers such as locking nuts 38. Locking nuts 38 act to limit the overall maximum speed of the go-kart 12 by acting as "radial movement stops" for weights 32. Assembly 10 also includes a driver pulley 16, a driven pulley 18, and a belt 20 coupled to both driver and driven pulleys 16, 18 as shown, for example, in FIGS. 1 and 2. An outer shroud or covering 19 is provided to protect driver and driven pulleys 16, 18 and their components within.

Driver pulley 16 includes an outer drum 22, a movable pulley flange 26, a fixed pulley flange 28, a chamber 29 formed between outer drum 22 and movable pulley flange 26, and a weight assembly 24 positioned to lie within chamber 29. Weight assembly 24 includes a pair of C-shaped cam weights 32, a pair of springs 34, a pair of guideposts 36, and a pair of locking nuts 38 so that one locking nut 38 is coupled to each guidepost 36. Each cam weight 32 is semi-circular in shape providing an outer curved surface 40 and an inner curved surface 42. Each cam weight 32 also includes end surfaces 44, 46 such that when end surfaces 44, 46 of opposite cam weights 32 are aligned with each other, a ring (not shown) is formed.

Outer surface 40 is formed to include spaced-apart grooves 48 formed for receiving springs 34. When assembled, springs 34 extend about the circumference of weights 32 thereby biasing weights 32 together but allowing for some movement of weights 32 relative to one another. A first end 51 of each guidepost 36 extends from and is fixedly coupled to end surface 44 of one of the weights 32. Each guidepost 36 also includes a second end 52 having a threaded portion 54 with nominal length 56. Locking nuts 38 are provided for coupling with threaded portion 54 of guideposts 36. In other embodiments, alternate guideposts (not shown) are formed to include a smooth portion rather than threaded portion 54 of guideposts 36. The smooth portion may be formed to include one or more grooves therein. Alternate stoppers or snap rings (not shown) may be provided in order to couple with each alternate guidepost such that each snap ring is received within any one of the grooves. The snap rings are provided as a "stop" for weights 32 and provide the same function as locking nuts 38.

Each weight 32 is also formed to include an aperture 58 extending from outer surface 40 to end surface 46, as shown in FIG. 1. Aperture 58 is formed to receive guidepost 36 extending from end surface 44 of opposite cam weight 32. A stop block 60 is formed to extend outward from outer surface 40 of each weight 32 as shown in FIGS. 1, 3, 5, and 7. Stop block 60 is formed to engage locking nut 38 in order to limit the radially outward movement. In a preferred embodiment, stop block 60 is spaced-apart from aperture 58 so that aperture 58 does not extend through stop block 60.

Movable pulley flange 26 of driver pulley 16 is formed to include an outer surface 64 and an inner surface 66 wherein outer and inner surfaces 64, 66 are concave such that when assembled, inner surface 66 faces weight assembly 24 as shown in FIGS. 2–7. Flange 26 also includes an outer lip 68 extending about a circumference of flange 26 and also extending in a direction toward weight assembly 24. A hub 100 is coupled to both movable pulley flange 26 and outer drum 22.

Fixed pulley flange 28 similarly includes an outer surface 78 and an inner surface 80. Outer surface 78 of fixed pulley flange 28 faces outer surface 72 of movable pulley flange 26 so that when assembled, a V-shaped groove 82 is formed. An outer lip 84 also extends about the circumference of fixed pulley flange 28 to the right, or in a direction away from movable pulley flange 26. Fixed pulley flange 28 also includes a sleeve 86 extending through an aperture (not shown) formed in flange 28. Extending through sleeve 86 is an attachment rod 90. Rod 90 is formed to include a threaded aperture 92 extending from a far end 91 of rod 92 and partially through the center of rod 90. Rod 90 is positioned to extend into chamber 29 of weight assembly 24 and is positioned to lie between each cam weight 32. Threaded aperture 92 is formed to receive a bolt 30 therein in order to couple weight assembly 24 to attachment rod 90.

Outer drum 22 of driver pulley 16 includes an outer surface 94, an inner surface 96, and a lip 98 extending about the circumference of drum 22 in a direction toward weight assembly 24 as shown in FIG. 1. Hub 100 is positioned to lie within chamber 27 of weight assembly 24 and extends from inner surface 94 of outer drum 22 to inner surface 66 of movable pulley flange 26. Hub 100 is formed to include an aperture (not shown) for receiving attachment rod 90. A bearing 70 is positioned to lie between hub 100 and each cam weight 32.

Figure 2:
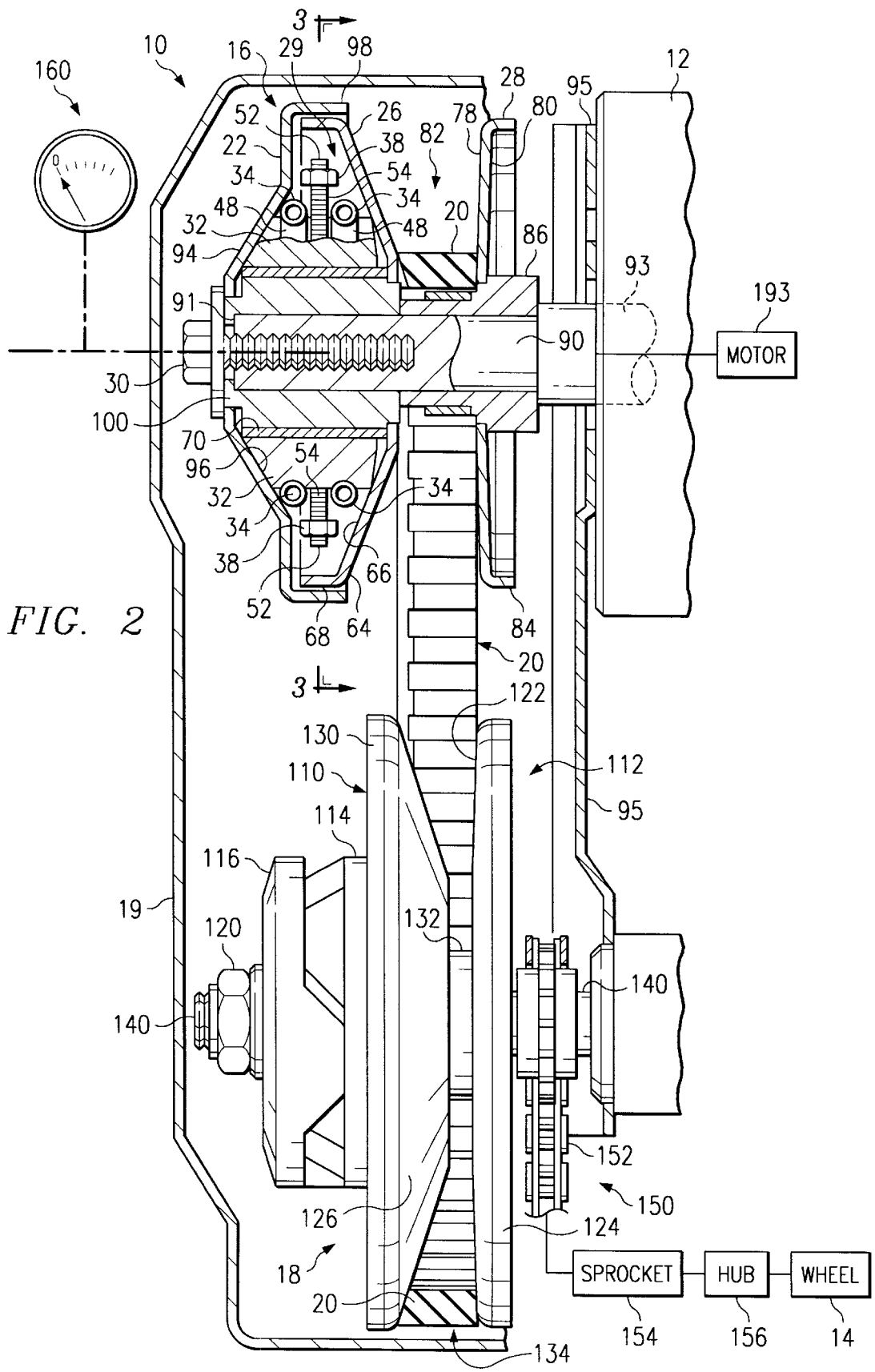
FIG. 2 is a partial sectional view of the torque converter and go-kart of FIG. 1 showing both pulleys of the torque converter at rest as indicated by a speedometer used to demonstrate the rate of rotation of the driver pulley.

When assembled, outer drum 22 and movable pulley flange 26 enclose weight assembly 24. Weights 32 of weight assembly 24 are coupled together by guideposts 36 and locking nuts 38. Springs 34 also act to couple weights 32 together in a first position when the motor is running at idling speed by lying in grooves 48 of outer surface 40 of each weight 32. Hub 100 is positioned to lie between weights 32. Inner surfaces 42 of weights 32 contact an outer surface 72 of bearing 70. An aperture 76 of bearing 70 is formed to receive hub 100 therein. Sleeve 86 extends through fixed pulley flange 28 and engages hub 100. Finally, attachment rod 90 is formed to extend through sleeve 86 of fixed pulley flange 28 and drum hub 100 as shown in FIGS. 2, 4, and 6. Bolt 30 is then formed to extend through outer drum 22 to thread within threaded aperture 92 of rod 90 to fixedly secure driver pulley 16. Attachment rod 90, hub 100, and bearing 70 are all positioned to lie within chamber 29 and between each cam weight 32. Attachment rod 90 is also coupled to a motor shaft 93 wherein motor shaft 93 is coupled to the motor 193 and is formed to extend through mounting bracket 95 of torque converter assembly 10.

Driven pulley 18 similarly includes a movable pulley flange 110, a fixed pulley flange 112, a fixed cam 114, a button 116, a torsion spring 118, and locking nut 120. Fixed pulley flange 112 includes an outer surface 122, an inner surface (not shown), and an outer lip 124 extending about the circumference of the flange 112. Movable pulley flange 110 further includes an outer surface 126, an inner surface 128, and an outer lip 130 extending about the circumference of movable pulley flange 110. Movable and fixed pulley flanges 110, 112 are separated by a bushing 132. A second V-shaped gap 134 is formed between movable and fixed pulley flanges 110, 112 of driven pulley.

A threaded jack shaft 140 extends through movable pulley flange 110, fixed pulley flange 112, and bushing 132. Jack shaft 140 also extends through spring 118, button 132, and fixed cam 114. Locking nut 120 is threaded into jack shaft 140 in order to fixedly secure jack shaft 140 to driven pulley 18. Jack shaft 140 also extends through mounting bracket 95.

A chain link system 150 is used to gear down the rotational rate of jack shaft 140 of driven pulley 18 to wheel 14 of go-kart 12. Chain link system 150 includes a chain 152 and a sprocket 154. Chain 150 is looped between jack shaft 140 and sprocket 154, as shown in FIG. 1. The diameter of sprocket 154 is greater than the diameter of jack shaft 140 so that the rate of rotation of sprocket 154 is less than that of jack shaft 140. Sprocket 154 is coupled to a hub 156 which is coupled to wheel 14 so that the rotational speed of sprocket 154 is equal to the rotational speed of wheel 14.

In general operation, when the motor is running at idling speed, driver pulley 16 is rotating at a minimal speed so that springs 34 bias cam weights 32 to remain in a fully closed position, as shown in FIG. 2. Speedometer 160 is attached to driver pulley 16 and is representative of the speed of the go-kart 12 or motorized vehicle. Shown here, V-shaped groove 82 is at a maximum so that belt 20 rides on sleeve 86 at the bottom of groove 82 and is declutched from driver pulley 16. Belt 20 is, therefore, loose on driven pulley 18. Torsion spring 118 (shown in FIG. 1) will rotate movable pulley flange 130 in a direction to cause cam 114 to push flange 130 to its fully closed position against fixed pulley flange 110. This causes belt 20 to take a position at the outer periphery of driven pulley 18 as shown in FIG. 2.

Figure 3:
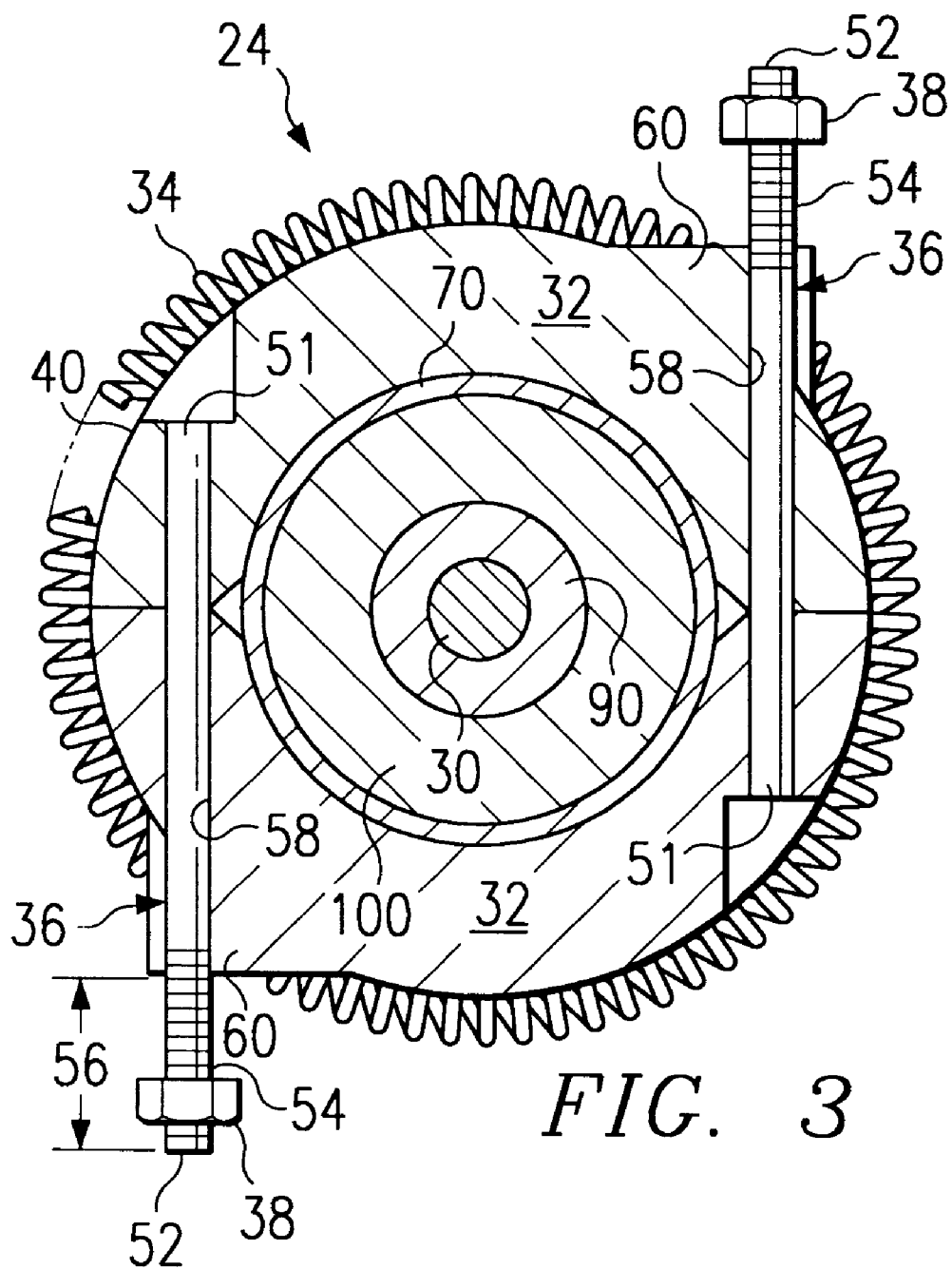
FIG. 3 is a sectional view taken along line 3—3 of FIG. 2 showing a weight assembly including the upper and lower C-shaped weights held together by springs (one of which is shown in FIG. 3 and both of which are shown in FIG. 1) and showing threaded rods coupled to the upper and lower C-shaped weights to control movement of one weight toward and away from the other weight as shown, for example, in FIGS. 5 and 7 and threaded locking nuts secured at each end of the threaded rods.

At idling speed, weight assembly 24 rests in a fully closed position as shown in FIG. 3. Springs 34 act to hold weights 32 together in this closed position. As shown in FIG. 3, locking nuts 38 are positioned near each end 52 of guideposts 36. Locking nuts 38 are manually adjustable along the length 56 of threaded portion 54. Each guidepost 36 of weights 32 extends through aperture 58 and rests within channel 57 of opposite weight 32.

As the motor increases speed, weights 32 of driver pulley 16 are urged to move radially outward against the spring force of springs 34 due to the centrifugal force placed on weights 32 by the rotation of rod 90. Because weights 32 are not rigidly coupled to one another, guideposts 36 are able to translate within apertures 58 and channels 57 allowing weights 32 to move farther and farther apart with increased speed from the motor as shown in FIG. 4. As weights 32 move apart due to centrifugal forces, outer surface 40 of weights 32 engages inner surface 66 of movable pulley flange 26 and inner surface 96 of outer drum 22. This camming action causes movable pulley flange 26 to move to the right toward fixed pulley flange 28 thereby decreasing the width of V-shaped groove 82. As movable pulley flange 26 moves to the right by the camming action of weights 32, movable and fixed pulley flanges 26, 28 grip the sides of belt 20.

Due to the decreasing width of groove 82, belt 20 is urged to ride at a greater radius around driver pulley 16. The resulting increased tension on belt 20 acts on driven pulley 18. Movable pulley flange 110 of driven pulley 18 is urged to the left or away from fixed pulley flange 112. This motion works against the closing bias of torsion spring 118 and cam 114. The effective radius of driven pulley 18 is thereby reduced by the increased speed of the motor. The increased speed of the motor thus causes a reduction in the drive ratio which can be defined as the ratio of the number of rotations of the drive pulley 16 over the number of rotations of the driven pulley 18.

If torque converter assembly 10 encounters increased torque, driven pulley 18 responds to increase the drive ratio. Such torque, which might be seen by wheel 14, increases the pull on belt 20, which in turn rotates movable pulley flange 110 forward in the direction of drive rotation relative to jack shaft 140. This causes cam 114 to force movable pulley flange 110 toward fixed pulley flange 112 thereby reducing the width of second V-shaped groove 134. With a reduction in groove 134, belt 20 is caused to ride at a larger radius on driven pulley 18 thus drawing belt 20 to a smaller radius on drive pulley 16 in counteraction to weights 32 of weight assembly 24. Weights 32 are thus forced inward to rotate at a more retracted position. This action increases the effective radius of driven pulley 28 and decreases the effective radius of driver pulley 16 to cause an increase in the drive ratio.

There is a continuous equilibrium between the speed response produced by the action of weights 32 responding to centrifugal forces in driver pulley 16 and the torque response produced by the action of torsion spring 118 and cam 114 in driven pulley 18. The drive ratio is continuously and infinitely varied in response to these two actions to provide a drive ratio suited to the existing operating conditions.

Locking nuts 38 of weight assembly 24 act to adjust and limit the rotational rate of weights 32. A distance X exists between each locking nut 38 and end surface 44 of the respective cam weight. By looking at FIGS. 4 and 5, it can be seen that locking nuts 38 are positioned to lie near second ends 52 of each guidepost 36. By positioning locking nuts 38 near second end 52, distance X is maximized so that a maximum rotational rate may be reached as shown by speedometer 160 FIG. 4. As weights 32 are urged radially outward by the centrifugal forces, stop blocks 60 on each weight 32 prevent weights 32 from separating farther than locking nuts 38. When weights 32 have expanded to their maximum position, stop block 60 engages locking nut 38 thereby preventing each weight 32 from expanding further. Effectively, by limiting the outward movement of weights 32, the ultimate speed of go-kart 12 also becomes limited.

As shown in FIGS. 6 and 7, locking nuts 38 have been positioned midway along length 56 of threaded portion 54 of guideposts 36. Distance X of FIGS. 6 and 7 has thus decreased from the maximum distance X shown in FIGS. 4 and 5. In this case, a lesser rotational rate is seen by speedometer 160 than that illustrated in FIGS. 4 and 5. This occurs because when the amount of separation of weights 32 is limited, V-shaped groove 82 does not become as narrow to allow belt 20 to increase its effective radius on the driver pulley. Locking nut 38 can be adjusted to any position along threaded portion 54 of guideposts 36 in order to increase or decrease distance X to essentially pre-set the maximum radial movement of weights 32 thereby limiting the maximum speed of go-kart 12. Locking nuts 38 may also be completely removed in which case weight assembly 24 would continue to operate in the same manner. Without locking nuts 38, the only limit or "cap" on the speed of go-kart 12 would exist in the design specifications for the various parts of driver pulley 16. The addition of guideposts 36 and locking nuts 38 to weight assembly 24 allows the maximum speed of go-kart 12 to be controlled in situations where particular users are not able to travel in excess of a predetermined speed.

Although the invention has been described in detail with reference to certain preferred embodiments, variations and modifications exist within the scope and spirit of the invention as described and defined in the following claims.

What is claimed is:

1. A torque converter assembly is provided for adjusting the overall speed of a vehicle, the assembly comprising
   a driver pulley including an outer drum, a movable flange, a chamber formed by the outer drum and movable flange, a first weight and a second weight each positioned to lie within the chamber, and a shaft extending into the chamber about which the first and second weights are positioned to lie for rotation,
   a pair of guideposts each having a first end fixedly coupled to a respective one of the first and second weights and a second end inserted in the other of the first and second weights, and
   a stopper coupled to the second end of each guidepost to limit the radially outward movement of the first and second weights.

2. The assembly of claim 1, wherein the first end of each guidepost extends from an end surface, the assembly further includes a distance X between each stopper and each respective end surface, and the stopper is movable along the guidepost in order to increase and decrease the distance X.

3. The assembly of claim 2, wherein each stopper is threadably coupled to the second end of each respective guidepost.

4. The assembly of claim 2, wherein the second end of each guidepost is formed to include multiple grooves for receiving the stopper therein.

5. The assembly of claim 1, wherein a first guidepost is fixedly coupled to the first weight and a second guidepost is fixedly coupled to the second weight so that the first weight is positioned to lie between the stopper coupled to the second guidepost and the second weight.

6. The assembly of claim 1, wherein each weight is formed to include a stop block having a channel for receiving the respective guidepost therein.

7. The assembly of claim 6, wherein each stop block is formed to engage the respective stopper coupled to the guidepost positioned to lie within the channel when each weight has moved a maximum distance radially outward from the shaft.

8. The assembly of claim 1, wherein the torque converter assembly is formed to include a pair of springs positioned to extend about the first and second weights in order to bias the weights in a first position and lie in spaced-apart relation to one another and each guidepost extends through a space provided between the spaced-apart springs.

9. A torque converter assembly is provided for adjusting the overall speed of a vehicle, the assembly comprising a driver pulley formed to include an outer drum, a movable flange, a chamber formed between the outer drum and the movable flange, a first weight positioned to lie within the chamber, a second weight positioned to lie within the chamber, and a shaft extending into the chamber about which the first and second weights can rotate, limiting means fixedly coupled to at least one of the first and second weights for limiting the radially outward movement of the weights in order to limit the maximum overall speed of the vehicle, and spring means for biasing the first and second weights toward each other.

10. The assembly of claim 9, wherein the limiting means includes at least one guidepost having a first end fixedly coupled to one of the two weights and a second end inserted in the other of the two weights.

11. The assembly of claim 10, wherein the limiting means further includes a stopper coupled to the second end of the at least one guidepost.

12. The assembly of claim 11, wherein the assembly further includes a means for adjusting a distance X from the stopper to the fixed end of the at least one guidepost.

13. The assembly of claim 9, wherein the assembly additionally includes means for adjusting the maximum overall speed of the vehicle.

14. The assembly of claim 11, wherein the weight in which the second end of the at least one guidepost is inserted is formed to include a stop block to engage the stopper when the weight in which the second end of the at least one guidepost is inserted has moved a predetermined distance radially outward from the shaft to preclude radial outward movement beyond the predetermined distance of the weight in which the second end of the at least one guidepost is inserted.

15. The assembly of claim 14, the spring means includes a pair of springs positioned to extend circumferentially about the first and second weights and to lie in spaced-apart relation to one another and the stop block is positioned to lie between the pair of springs and includes a substantially flat abutment surface that protrudes from a circumferential outer surface of the weight in which the second end of the at least one guidepost is inserted.

16. A torque converter assembly is provided for translating the overall speed of a motor of a go-kart or other such vehicle, the assembly comprising a pulley system including a drive pulley having an outer drum, a movable flange, and a chamber formed between the outer drum and the movable flange, a shaft positioned to lie within the chamber, a driven pulley, and a belt coupled to both the drive pulley and the driven pulley, a weight assembly positioned to lie within the chamber of the drive pulley, the weight assembly having a first weight and a second weight each positioned to lie within the chamber, at least one guidepost having a first end fixedly coupled to one of the first and second weights and a second end inserted in the other of the first and second weights, a stopper coupled to the second end of the at least one guidepost to abut the other of the first and second weights to limit the radially outward movement of the other of the first and second weights from the shaft, and means for adjusting the distance between the stopper and the first end of the guidepost.

17. The assembly of claims 16, wherein the torque converter assembly is formed to include a pair of springs positioned to extend about the first and second weights in order to bias the weights in a first position and lie in spaced-apart relation to one another and each guidepost extends through a space provided between the spaced-apart springs.

* * * * *